United States Patent [19]

Cuculo et al.

[11] 4,367,191
[45] Jan. 4, 1983

[54] PREPARATION OF CELLULOSE FILMS OR FIBERS FROM CELLULOSE SOLUTIONS

[75] Inventors: John A. Cuculo, Raleigh; Samuel M. Hudson, Charlotte, both of N.C.

[73] Assignee: Research Corporation, New York, N.Y.

[21] Appl. No.: 247,308

[22] Filed: Mar. 25, 1981

[51] Int. Cl.³ ............................................. D01F 2/00
[52] U.S. Cl. ............................... 264/187; 166/163 R; 264/207
[58] Field of Search ............................... 264/187, 207; 166/163 R; 536/30, 35, 56, 57, 84

[56] References Cited

U.S. PATENT DOCUMENTS

| | | | |
|---|---|---|---|
| 625,033 | 5/1899 | Hayne | 264/187 |
| 1,301,652 | 4/1919 | Clayton et al. | 536/56 |
| 1,691,345 | 11/1928 | Fulton | 536/56 |
| 2,009,015 | 7/1935 | Powers et al. | 427/339 |
| 4,278,790 | 7/1981 | McCormick | 106/163 R |

OTHER PUBLICATIONS

Journal of Macromolecular Science-Review of Macromolecular Chemistry C 18 (1), (1980), pp. 1-82, Hudson and Cuculo.
Journal of the American Chemical Society, vol. 53, (1931), pp. 4009-4013, Scherer.

Primary Examiner—Jay H. Woo
Attorney, Agent, or Firm—Oblon, Fisher, Spivak, McClelland & Maier

[57] ABSTRACT

A method of forming a cellulose fiber which comprises dissolving cellulose in a solvent comprising ammonia and a salt and subsequently forming a fiber.

22 Claims, 6 Drawing Figures

PREPARATION OF CELLULOSE FILMS OR FIBERS FROM CELLULOSE SOLUTIONS

BACKGROUND OF THE INVENTION

1. Field of the Invention

The present invention relates to the preparation of cellulose films or fibers from cellulose solutions.

2. Description of the Prior Art

Cellulose for many years has been converted into fiber form using either the cuprammonium process or the viscose process, both of which involve derivatization and subsequent regeneration. The acceptance of rayon fibers has been limited because of the availability of inexpensive synthetic fibers prepared from petrochemicals. With the increased loss of crude oil renewed interest has been expressed in cellulose as a textile material. However, both of the commercial processes for preparing rayon fibers suffer from severe shortcomings. In particular, both processes are energy intensive, which to a large extent cancels out the potential savings obtainable from the use of cellulosic products as raw materials. Further, both the cuprammonium process and the viscose process produce effluent streams containing significant amounts of toxic materials which must be removed before the effluent can be disposed of. As a result, rayon consumption has not increased significantly. Cellulose fibers could supplant many of the synthetic fibers in textiles if they could be produced in a manner which is economically and environmentally superior to the techniques now available. This would reduce the consumption of non-renewable petrochemical resources.

The solubility of unmodified, that is nonderivatized, cellulose has been studied by many researchers. A review of the literature on these studies is found in *Journal of Macromolecular Science—Review of Macromolecular Chemistry* C 18 (1) (1980), Pp. 1–82, by Hudson and Cuculo. Scherer, in the *Journal of the American Chemical Society*, Vol. 53 (1931), Pp. 4009–4013, discloses dissolving cellulose in an ammonia-salt solution. However, Scherer's attempts to form films from the dissolved cellulose failed. Schleicher et al. in *Faserforch Textiltech*, 23, pp. 335–340 (1972), suggest dissolving wood pulp in a mixture of polar organic solvent, an amine and ammonia and a salt.

Accordingly, there exists a need for a process capable of producing cellulosic films or fibers economically and in an environmentally acceptable manner.

SUMMARY OF THE INVENTION

Accordingly, it is an object of this invention to produce cellulosic fibers from cellulose in a manner which is not energy intensive.

It is a further object of this invention to produce cellulosic films or fibers at temperatures not substantially above room temperature.

It is another object of this invention to produce cellulosic fibers and films in a manner which does not involve the release of toxic chemicals to the environment.

A further object of this invention is to prepare cellulosic fibers and films by simply dissolving cellulose without derivatization and forming a fiber.

These and other objects of the present invention, which will become apparent from the following description, have been achieved by dissolving cellulose in a solvent system comprising ammonia and salts which form a stable liquid media with the ammonia and subsequently forming a film or fiber using conventional film or fiber forming procedures.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

The success of the present procedure depends upon dissolving the cellulose a solvent consisting of liquid ammonia containing salt and in certain cases water. Since ammonia is gaseous under ambient conditions, liquid ammonia is admixed with salts which result in the formation of a liquid ammonia solvent solution which is stable under normal atmospheric pressure. Preferably, the solution is stable, that is no substantial evolution of ammonia occurs, at atmospheric pressure at temperatures up to about 40° C. Ammonium solutions which evolve ammonia at temperatures less than 40° C. may be used, but care must be taken during the fiber or films forming steps not to exceed the temperature at which substantial ammonia evolution occurs. Solutions which are stable up to 40° C. are preferred because this allows the processing to be performed under a wide range of ambient temperatures without the need for cooling. The ammonia solvent solution should also be stable at low temperatures to allow for flexibility in processing the cellulose. Solutions which are stable down to −20° C. are particularly preferred. Thus, the ammonia solvent solution is preferably stable at atmospheric pressures in the temperature range of from about −20° C. to at least about 40° C., still more preferably 100° C. The salts which have been found to produce such solutions are characterized by relatively large anions, and are generally inorganic. The preferred salts are ammonium and sodium iodides, thiocyanate, nitrate and perchlorate. Sulfates, potassium salts, borates, carbonates, acetates, formates and many alkylammonium salts of thiocyanate, iodide and nitrate have proven unsatisfactory. Ammonium thiocyanate is particularly preferred.

The relative amounts of salts and ammonia in the solvent system can vary. However, the amount of ammonia present must not be sufficient to fully solvate each ion of the salt. In general, from 4 to 6 ammonia molecules or other solvating species are necessary to solvate each ion depending upon the specific ion. The molecules of ammonia necessary to solvate each salt ion is well-known. Thus, one can readily determine the maximum quantity of ammonia which can be used with the specific salt under consideration.

Generally, the solution will comprise from about 20–30 wt % ammonia, and about 70–80 wt % of the salt. The action of the ammonia solvent solution in dissolving cellulose can be enhanced by the presence of small quantities of water. Generally, the dissolution power of the ammonia solution will be effective with up to about 8 wt % of water. Preferably the water content is from 0–5 wt % of the ammonia solvent solution. All the weight percents for the ammonia solvent solution are on a cellulose-free basis.

It is theorized that solution of cellulose in the ammonia solvent solution is largely a physical phenomenon. The cellulose hydroxyl sites in many ways are quite similar to the properties of the ammonia molecule. Thus, the ammonia-ion solvates diffuse into the cellulose crystals in order to satisfy the minimum solvation requirements of the ions. This results in the disruption of the cellulose crystals and the creation of a cellulose solution.

If one desires to use salts other than those specifically described, one need only prepare a saturated ammonia salt solution and test for its efficacy in dissolving cellulose.

The ammonia solvent solution is prepared by simply admixing the liquid ammonia, salts and water, if used. The mixing temperature is not critical and the preferred ammonium thiocyanate dissolves endothermically. Temperatures up to about 70° C. are satisfactory, with from −20° C. to about 70° C. being preferred, room temperature particularly preferred, in order to minimize ammonia evaporation.

Once the ammonia solvent solution has been prepared, the cellulose may be dissolved in it. The concentration of cellulose which can be dissolved is a function of the molecular weight of the cellulose which is often expressed as the degree of polymerization, D.P. Cellulose concentrations up to about 20 w/v% can be prepared. However, in preparing fibers it is often not desirable to employ the maximum concentration of cellulose possible when spinning fibers directly from the ammonia solvent solution. Quite often the best spinning results are obtained at lower concentrations. The specific concentration being a function of the viscosity of the solution which in turn is a function of the molecular weight and cellulose concentration; solution temperature, the spinning speed and fiber properties desired. Generally, cellulose concentrations of from 2 w/v% to 20 w/v% will prove satisfactory. The preferred cellulose concentration is from 2 w/v% to 14 w/v%.

The temperature of the ammonia solvent-cellulose solution is not critical. When fibers are to be formed directly from this solution it is necessary to maintain the solution below its boiling point to prevent ammonia evolution. Generally temperatures of from −40° C. up to the boiling point of the solution at prevailing conditions can be used. Preferably the temperature is about ambient.

Prior to commencing spinning from the ammonia solvent-cellulose solution it is necessary to allow the viscoelastic properties of the solution to stabilize, in particular, the viscosity of the solution. If one does not allow stabilization to occur, formation of acceptable fibers may be difficult. Determination that the solution has stabilized is readily made by periodic viscosity checks. Once the viscosity readings remain approximately constant, the fibers may be formed from the solution. Generally, stabilization occurs in 24 hours or less.

One distinct advantage to the present process is that the solution need not be used immediately as in the cuprammonium process. This allows for the preparation of cellulose solution well prior to commencement of fiber or film formation.

Any fiber forming techniques may be used to prepare cellulose fibers from the solution including wet and dry spinning.

When forming fibers directly from the ammonia solvent-cellulose solution, wet spinning will normally be used. The coagulation bath will comprise any system which coagulates the cellulose into a satisfactory fiber. Many such baths are known, as are tests for determining the suitability of any particular composition sought to be used as the coagulant system. The coagulant may comprise water, aqueous solutions of acetic acid, sulfuric acid or methanol (with or without water), glacial acetic acid and similar systems. Aqueous systems at 20° C. comprising zinc sulfate and sodium sulfate have not proven satisfactory, nor have some mixtures of aqueous sulfuric acid with sodium sulfate. Equal parts of acetic acid with methanol have also proven unsatisfactory at 20° C. Water alone at 20° C. has proven unsatisfactory, but at elevated temperatures, on the order of 50° C., it is satisfactory as the coagulant.

Aqueous acetic acid systems containing sodium chloride have proved satisfactory coagulants as have aqueous sulfuric acid systems containing zinc sulfate. The temperature of the coagulant bath is not critical so long as a satisfactory fiber results. In general, ambient temperatures are preferred. Thus, the preferred coagulant bath includes aqueous acetic acid solutions, preferably containing 20–98 v/v% acetic acid, aqueous sulfuric acid systems, preferably containing from about 2–10% sulfuric acid, aqueous methanol, preferably containing only small quantities of water, aqueous acetic acid containing sodium chloride, preferably 2–98% acetic acid, 0 to 15% sodium chloride and aqueous sulfuric acid containing zinc sulfate, preferably from 2–10% sulfuric acid and 0 to 15% zinc sulfate.

In addition to spinning the fibers directly from the ammonia solvent-cellulose solution, it is also possible after dissolving the cellulose in ammonia solvent solution to replace the ammonia solvent with an organic solvent. It is not necessary to wait until the ammonia solvent-cellulose solution reaches viscoelastic equilibrium to replace the ammonia solvent with an organic solvent. The ammonia and salts are then removed by suitable means, such as boiling-off of the ammonia and freezing out of the salts. Fibers may then be spun from the resulting cellulose-organic solvent solution by either wet or dry spinning or combinations.

The organic solvents will not dissolve cellulose directly. However, once the cellulosic polymer structure has been disturbed and the cellulose dissolved in the ammonia salt solution, many solvents can be used to replace the ammonia solvent solution with the cellulose remaining dissolved only in the organic solvent. It is simple to determine which organic solvents are suitable in this regard. Typical organic solvents which have proven useful are glycerol, dimethyl formamide, 2-pyrolidone, ethylene diamine, morpholine and pyridine. The amount of organic solvent which is used is sufficient to retain the cellulose in the dissolved state and provide the desires spinning properties. Generally from 50 w/v% to 300 w/v% of organic solvent based on the total of ammonia solvent, cellulose and organic solvent is employed, preferably from about 50 w/v% to 100 w/v%. Most preferably about 50% organic solvent is added based on the total amount of ammonia solvent, cellulose and organic solvent. One adds the ammonia solvent-cellulose solution to the organic solvent or vice versa.

Cellulose from any source may be employed including regenerated cellulose. Prior to using the cellulose, it is separated and recovered from the raw material as more or less delignified cellulosic fibers. Conventional pulping techniques are employed to accomplish this. The particular pulping technique used is not critical. The cellulose quality necessary for use in the present technique is the same as that used in the viscose rayon process. Cellulosic materials useful in the viscose rayon or cuprammonium process may be employed in the present process.

Suitable sources of cellulose include wood fibers of both softwoods and hardwoods, bast fibers such as flax, jute, hemp and ramic, leaf fibers such as sisal and abaca and seed fibers such as those from crude or purified cotton. Normally, cellulosic fibers are prepared by pulping the raw material to liberate the fiber from the lingin and other materials. Pulping is not necessary, however, to liberate cellulosic fibers from materials such as cotton, where the cellulose content is very high.

Prior to preparing fibers from the cellulose solution, the solution is filtered to remove any impurities or particles which might otherwise block the spinnerette holes. The filtering techniques used are well-known to those skilled in the art and include those used in the cuprammonium process and viscose process. It is desirable to dearate the solution prior to spinning. In dearating the solution care should be taken not to reduce the pressure to the boiling point of the solvent system to avoid precipitation of the cellulose as a result of the reduced solvent content. Dearation techniques are well-known in the fiber making art and any conventional procedure may be used.

Figure 6:
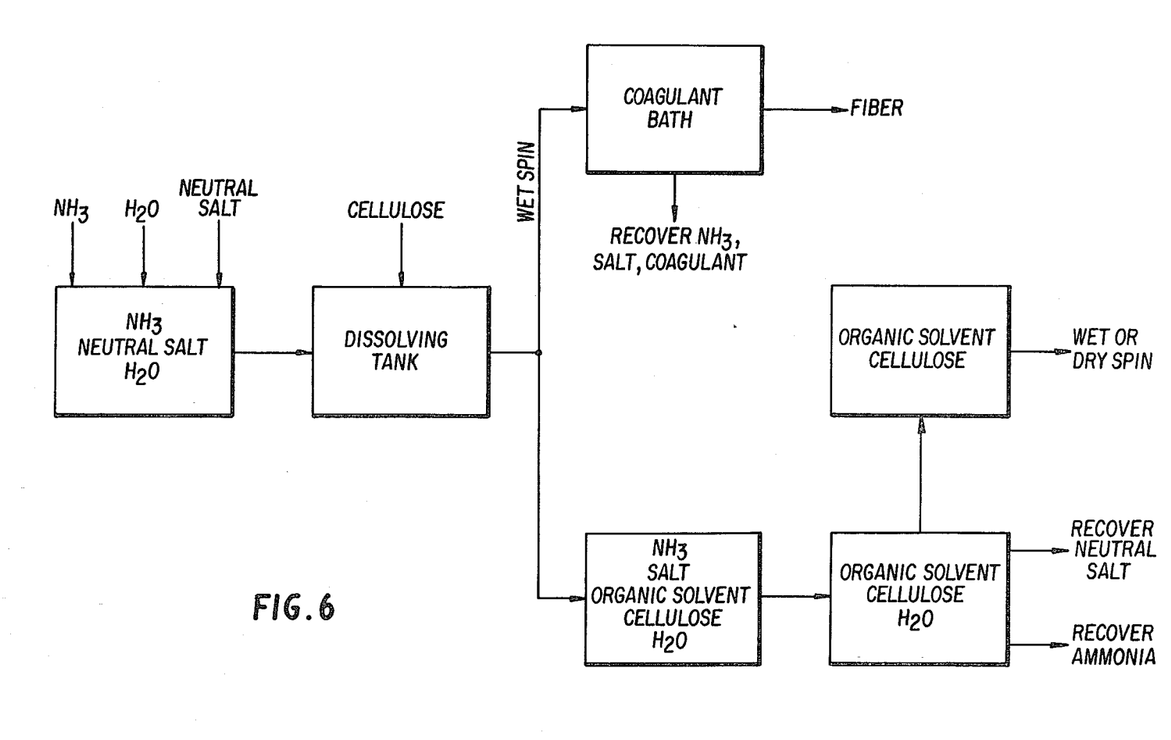
FIG. 6 is a typical flow diagram for the present process.

A typical flow sheet for the present process is shown in FIG. 6. Initially an ammonia solvent solution is prepared, preferably in an agitated vessel. This ammonia solvent solution may be used immediately or may be stored until needed. The cellulose is added to the ammonia solvent solution to form a cellulose solution. Typically this is done in an agitated vessel to facilitate dissolving of the cellulose. The cellulose solution may be held in this vessel until its visco-elastic properties have stabilized or it may be pumped to a separate storage vessel. The cellulose solution may be stored until needed. Fibers may be prepared directly from the ammonia solvent-cellulose solution, preferably after filtration and dearation once the visco-elastic properties have stabilized. Alternatively, the ammonia solvent solution may be replaced by an organic solvent and the fiber spun from this solution preferably after filtration and dearation. Regardless of the procedure employed, finely ground materials, such as titanium dioxide, may be incorporated into the solution to control the luster of the fibers produced.

Films may be formed directly from the ammonia solvent-cellulose solution by casting onto a suitable coagulation bath such as those used in fiber formation. Alternatively, the ammonia solvent may be replaced with an organic as described previously, and films formed by either casting and evaporating the solvent or by casting onto a coagulation bath.

Obviously, numerous additional modifications and variations of the present invention are possible in light of the above teachings. It is therefore to be understood that within the scope of the appended claims, the invention may be practiced otherwise than as specifically described herein.

Experiment 1

Cellulose in the form of standard pulp sheets of four different grades were used in this experiment. The properties of these materials are set forth in Table 1. In addition, Avicel ® a low molecular weight cellulose, M.W. $3.08 \times 10^4$, (D.P. 190) in powder form was also used.

Pulp Preparation

1. Material as Received

Pulp sheet samples were cut into small pieces, and shredded dry in a Wiley Mill. They were then dried 24 hours at 60° C. in a vacuum oven, and stored in a dessicator until used.

Alkali-aged Pulp

One pulp in sheet form (cellunier P) was steeped in 17.5% NaOH solution at 30° C. for 50 minutes, after which it was pressed to a final weight about 3.7 times the original dry weight. After shredding to finely divided pieces, it was aged 48 hours in a closed container at 30° C. Finally, the material was washed with distilled water and neutralized with 1.2% acetic acid solution. The D.P. of the starting material was 716 and the alkali aged product was 355.

Solvent Preparation

The solvent solution was prepared by condensing ammonia to a predetermined weight with a known amount of ammonium thiocyanate. Water was then added to result in a solvent having the following composition:
1. $NH_4SCN$: 72.1%
2. $NH_3$: 26.5%
3. $H_2O$: 1.4%

Cellulose Solution Preparation

Cellulose solutions were prepared by keeping a pulp slurry at $-12°$ C. in the above solvent for about 6 hours, followed by mechanical stirring of the mixture while it slowly came to room temperature.

Viscosity Measurements

The $\eta_0$ of cellulose solutions was measured in the Brookfield rotational viscometer.

Determination of Cellulose Molecular Weight

The molecular weight of cellulose was obtained from cuene intrinsic viscosity measured in the Ubbelohde viscometer.

Results

Molecular Weight Dependence of Cellulose Solution Viscosity

Molecular weight is one of the most important factors determining the rheology of a linear polymer. The extrapolated zero shear rate viscosities, $\eta_0$, of the cellulose solutions presently studied as functions of molecular weight at various concentrations are shown in FIG. 1.

Above a molecular weight of $8.83 \times 10^4$ (D.P. 545), $\eta_0$ increases abruptly. This reflects the point at which effective cellulose chain entanglements begin forming in the solvent system being investigated and flow becomes much more difficult. High shear rate extrusion of highly entangled polymer solutions will generally lead to large die swell and/or flow instability. FIG. 1 illustrates the decreased rate of increase of $\eta_0$ with molecular weight above $1.64 \times 10^5$ (D.P. 1015). This is interpreted as incomplete solvation. The solvent power is insufficient to overcome the strong hydrogen bonding forces between the very long molecular chains of cellulose.

Figure 1:
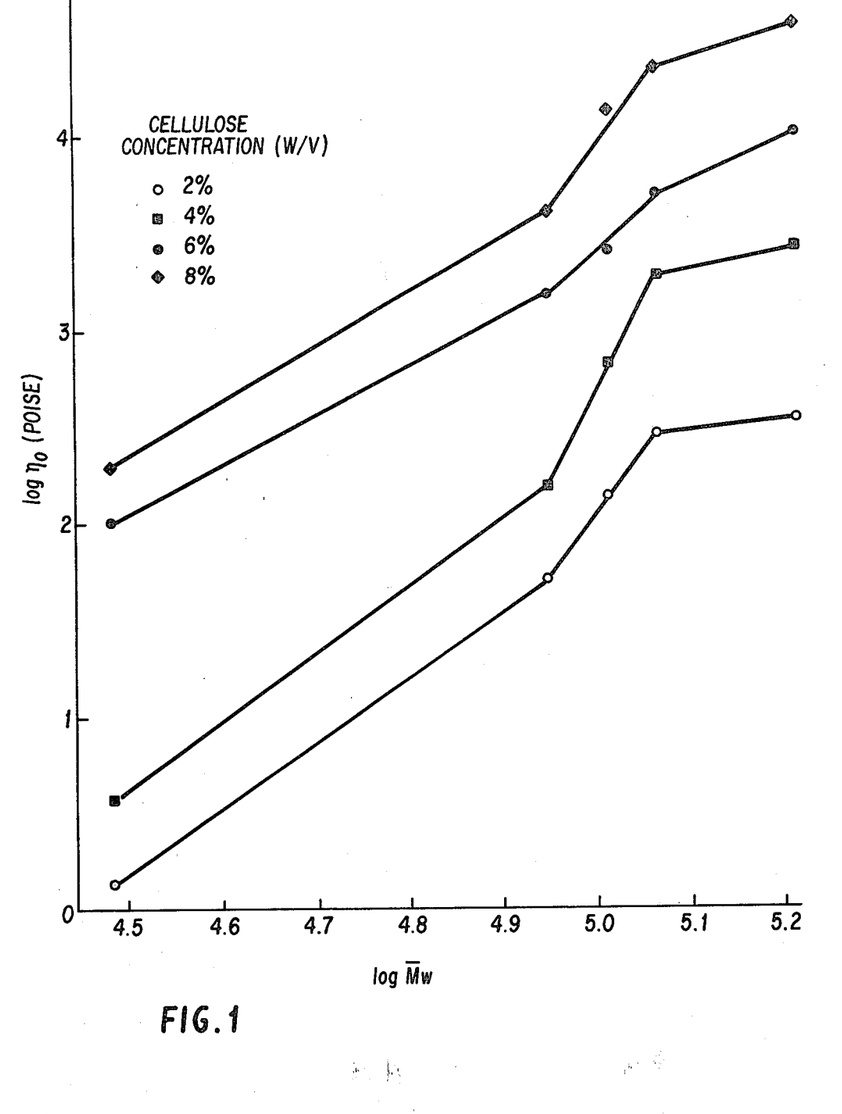
FIG. 1 illustrates the zero-shear rate viscosity of cellulose solution as a function of the molecular weight of cellulose at 30° C.

Table 2 shows the experimental data used to generate FIG. 1.

Concentration Dependence of Viscosity

Figure 2:
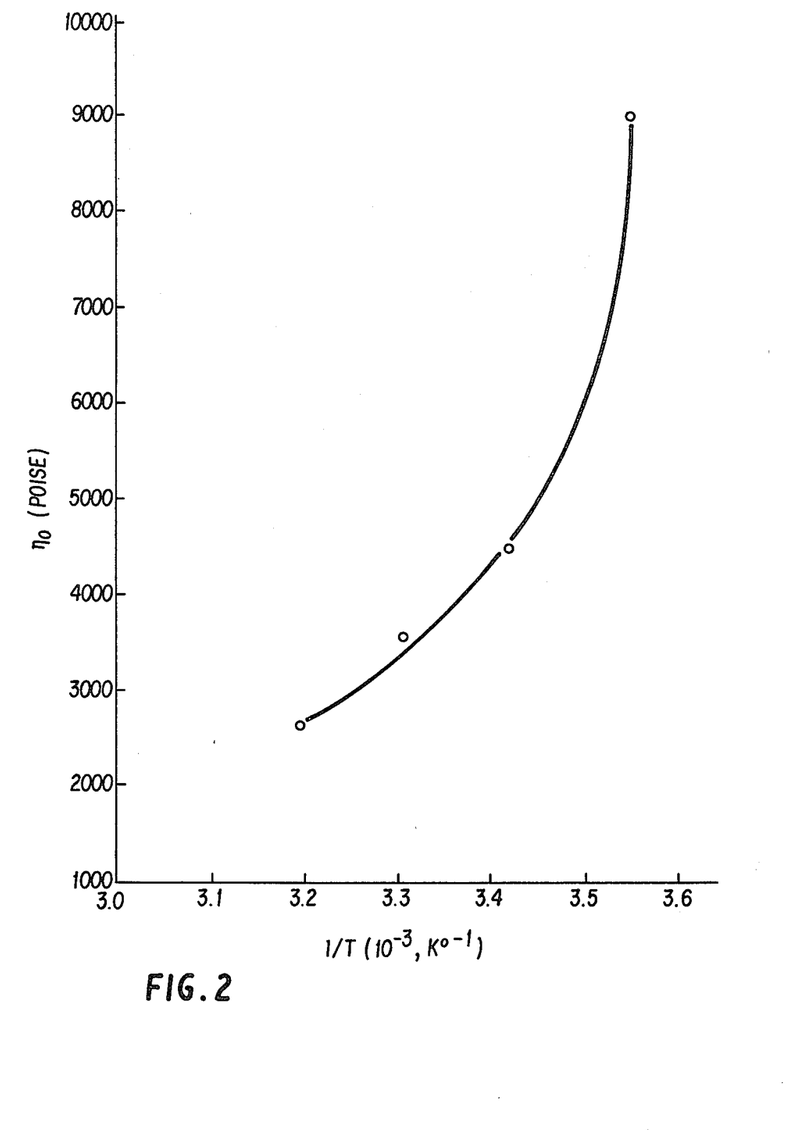
FIG. 2 illustrates the temperature dependence of a 6% cellulose solution (M.W. $1.01 \times 10^5$; D.P. 625).

Concentrations of 2, 4, 6 and 8 percent cellulose were used to investigate the effect of cellulose concentration on $\eta_0$ of solution in $NH_3/NH_4SCN$. The experimental results are shown in FIG. 1 and FIG. 2. The $\eta_0$ increases greatly with increasing cellulose concentration, and this effect is stronger than that of the molecular weight of cellulose.

Temperature Dependence of Viscosity

Most polymer solutions have a high inverse dependence of viscosity upon temperature at a given concentration. For the present studies, viscosities of 6 percent cellulose solutions were determined at temperatures of 10° C., 20° C., 30° C. and 40° C. This is the expected range of temperatures for spinning these solutions. Results are reported only for the molecular weight $1.01 \times 10^5$.

Figure 3:
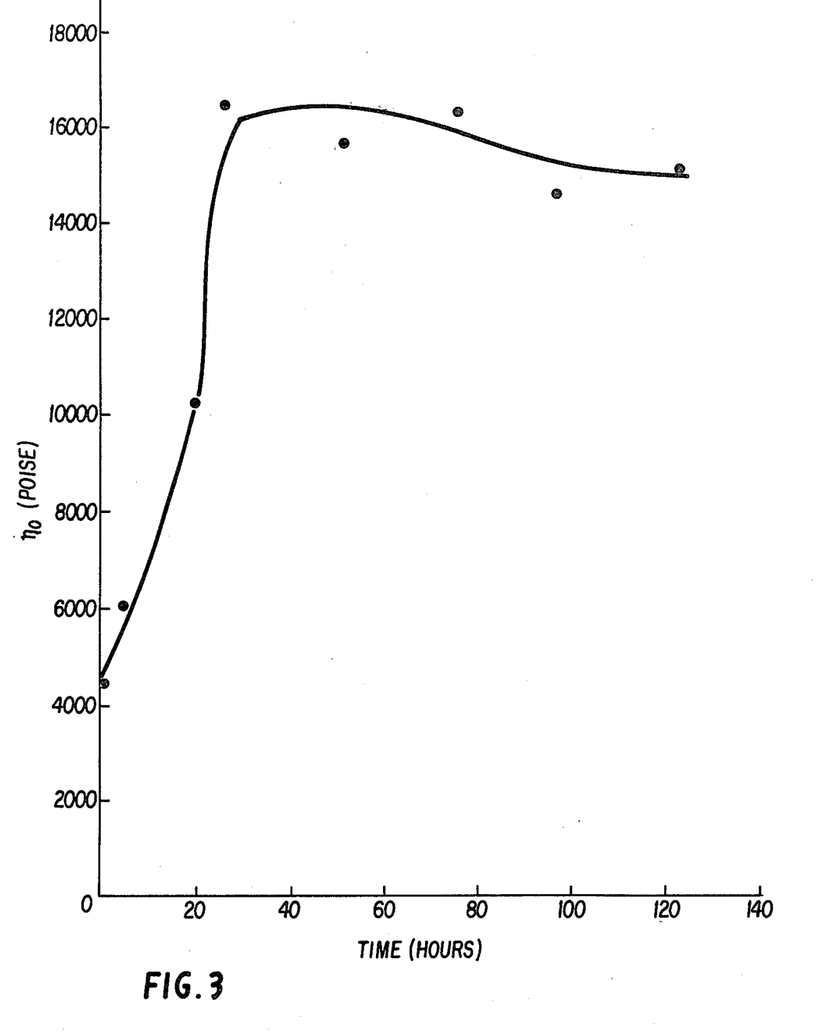
FIG. 3 illustrates the time dependency of a 6% cellulose solution (M.W. $1.01 \times 10^5$; D.P. 625) at 30° C.

The experimental results are shown in FIG. 3 and Table 3. The normal inverse temperature relationship is observed over the whole range of data. It should be noted that when the temperature of the cellulose solution was above 40° C., ammonia was observed bubbling up through the solution. Reduction of spinning dope viscosity by raising the temperature can facilitate many technical operations (homogenization, filtration, dearation, extrusion) but the limitation mentioned above must be taken into account.

Time Dependence of Viscosity

Figure 4:
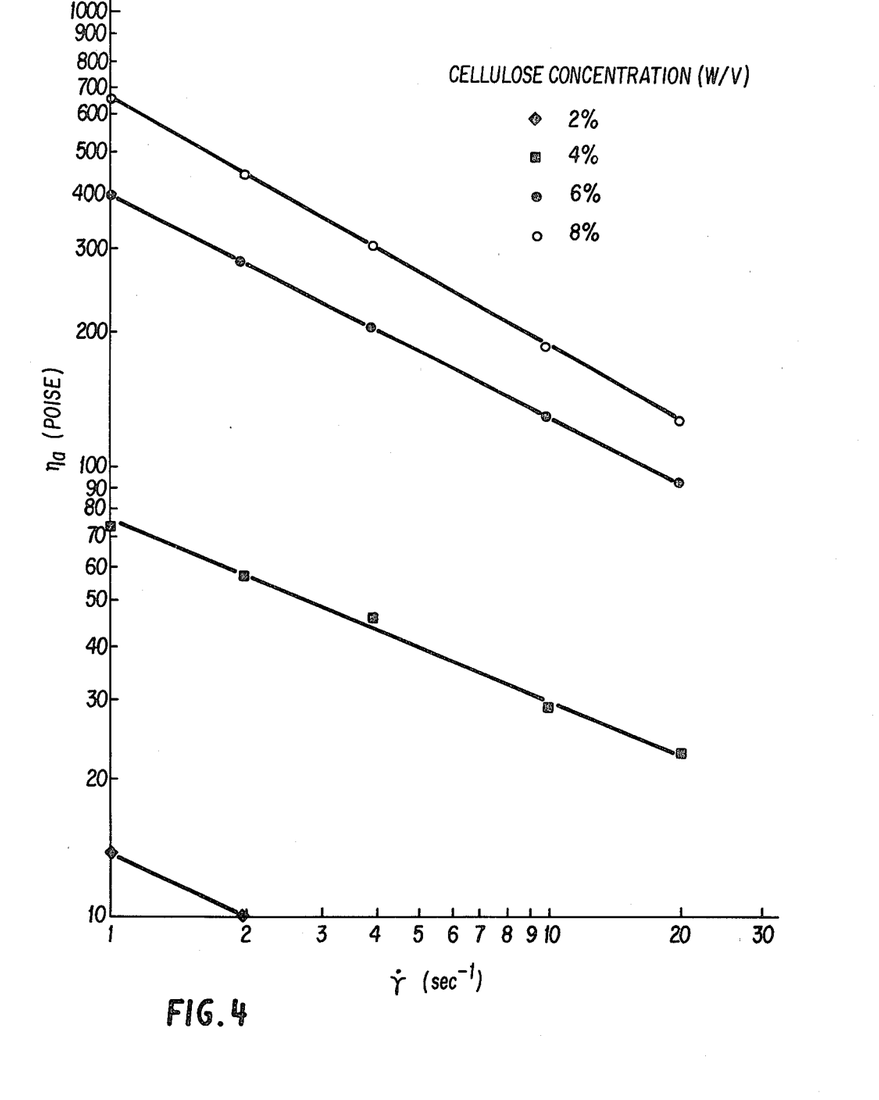
FIG. 4 illustrates the relationship between the apparent viscosity and the shear rate for cellulose solution at 30°; D.P.=545.

The stability of polymer solutions for spinning is a very important consideration. Concentrated cellulose solutions exhibit intensive molecular interactions and long periods are required for the attainment of viscoelastic equilibrium. The presently investigated cellulose solutions are shown to exhibit long time periods for the attainment of stable $\eta_0$. The data and plot of $\eta_0$ versus equilibration time at 30° C. are shown in Table 4 and FIG. 4, respectively. The solution is 6 percent cellulose of molecular weight $1.01 \times 10^5$ (D.P. 625). The sharp increase of viscosity is shown to reach a nearly stable level after 24 hours. Maintenance of constant viscosity in a solution intended for fiber spinning is very important because the variation of viscosity can lead to instability of the extrusion process. For this reason, the spinning solution may need to be stored about 24 hours after dissolving the cellulose in this $lNH_3/NH_4SCN$ solvent system.

Non-Newtonian Flow Behavior

An outstanding characteristic of polymer solutions is the non-Newtonian behavior exhibited, whereby the apparent viscosity, $\eta_a$, decreases as the rate of shear increases. This behavior is of tremendous practical importance in the processes of fiber spinning. The decreased viscosity makes the spinning solution easier to transport, filter, and extrude through the spinnerette.

Figure 5:
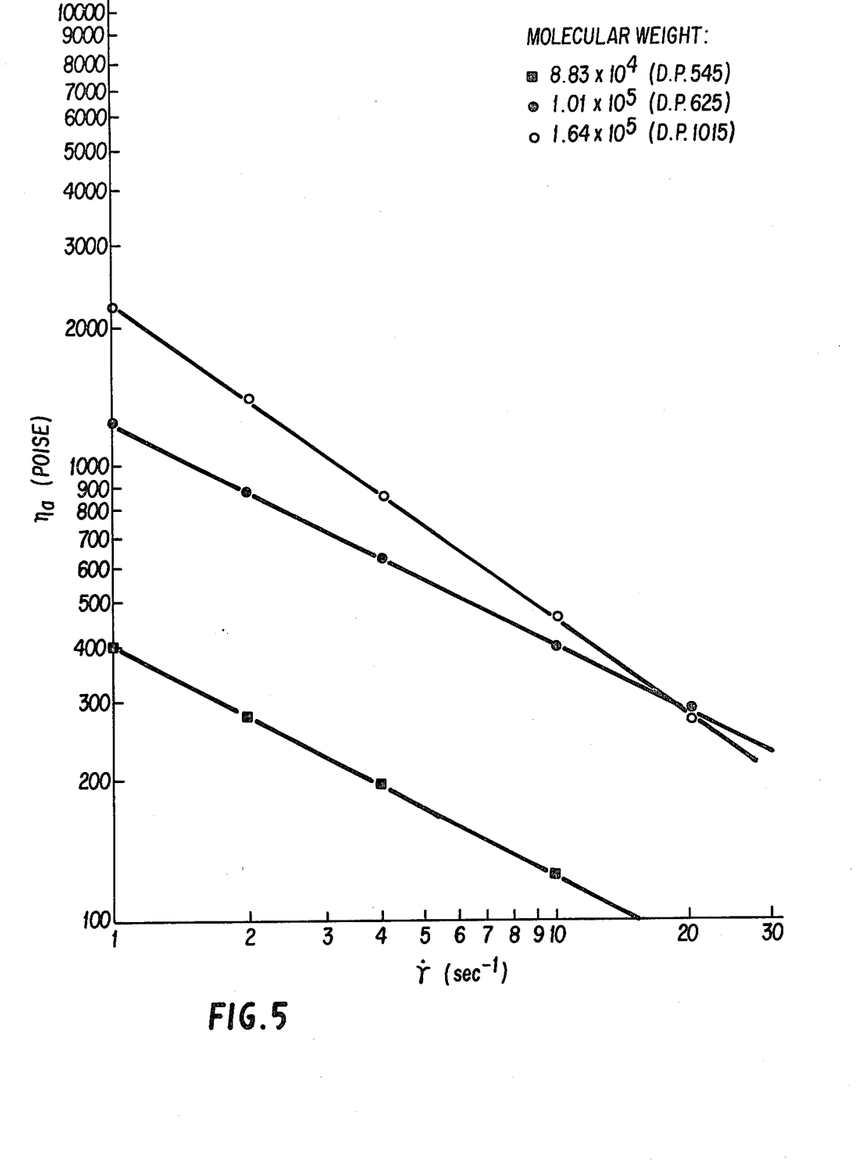
FIG. 5 illustrates the relationship of apparent viscosity and shear rate for a 6% cellulose concentration for various cellulose molecular weights at 30° C.

FIG. 5 and Table 5 show apparent viscosity versus shear rate for various concentrations of Rayselect J (Mw $8.83 \times 10^4$, D.P. 545) at 30° C. The data show that the higher concentrations exhibit the larger decrease of viscosity with increasing shear rate. This is expected because of the presumably higher chain entanglements.

FIG. 6 and Table 6 show data describing the molecular weight dependence of flow properties. For the three different pulps shown, the behavior is generally what one would normally expect. It is interesting to note that the viscosity of high molecular weight cellulose may be smaller than that of low molecular weight cellulose at very high shear rate.

Maximum Attainable Cellulose Concentration

The maximum attainable cellulose concentration is not necessarily the most practical one for fiber spinning. However, it will reflect upon the suitability of a particular solvent system for preparation of solutions of a specific polymer at various molecular weights. It is expected that the maximum attainable concentration increases with decreasing molecular weight of the cellulose. In this particular solvent system, the maximum cellulose concentration is 7.5 percent for Excel Q (Mw $1.64 \times 10^5$; D.P. 1015) and 10 percent for Cellunier P (Mw $1.16 \times 10^5$; D.P. 716). Finally, 14 percent cellulose concentration was obtained after reducing the D.P. of Cellunier P from D.P. 716 to D.P. 355.

TABLE 1

| ITT Rayonier Grade Name | Wood Pulp Pulp Process | $\overline{DP_w}$ | $\overline{Mw}$ |
|---|---|---|---|
| 1. Rayselect J | Prehydrolized Kraft | 545 | $8.83 \times 10^4$ |
| 2. Cellunier F | Sulfite | 625 | $1.01 \times 10^5$ |
| 3. Cellunier P | Sulfite | 716 | $1.16 \times 10^5$ |
| 4. Excel Q | Sulfite | 1015 | $1.64 \times 10^5$ |

TABLE 2

$\eta_o$ for Various Molecular Weights of Cellulose and Concentration (poise)

| Concentration (w/v) | D.P. 190 Mw $3.08 \times 10^4$ | 545 $8.83 \times 10^4$ | 625 $1.01 \times 10^5$ | 716 $1.16 \times 10^5$ | 1015 $1.64 \times 10^5$ |
|---|---|---|---|---|---|
| 2% | 1.32 | 50 | 141 | 316 | 337 |
| 4% | 6.50 | 150 | 680 | 1980 | 2750 |
| 6% | 98 | 1420 | 2600 | 5200 | 11000 |
| 8% | 200 | 3920 | 13360 | 21813 | 37800 |

TABLE 3

$\eta_0$ for 6% Cellulose Solutions (Mw $1.01 \times 10^5$; D.P. 625) at Various Temperatures

| Temperature | 10° C. | 20° C. | 30° C. | 40° C. |
|---|---|---|---|---|
| $\eta_0$ (poise) | 9000 | 4500 | 3560 | 2680 |

TABLE 4

$\eta_0$ for 6% Cellulose Solutions (Mw $1.01 \times 10^5$; D.P. 625) Various Storage Times at 30° C.

| Time (hour): | 1 | 6 | 18 | 24 |
|---|---|---|---|---|
| $\eta_0$ (poise): | 4320 | 6080 | 11800 | 16500 |

TABLE 4-continued $\eta_0$ for 6% Cellulose Solutions
(Mw 1.01 × 10⁵; D.P. 625)
Various Storage Times at 30° C.

| Time (hour): | 48 | 72 | 96 | 120 |
|---|---|---|---|---|
| $\eta_0$ (poise): | 14520 | 16240 | 13760 | 14960 |

TABLE 5

$\eta_a$ for Different Concentration of
Cellulose Solutions (Mw 8.83 × 10⁴;
D. P. 545) at Various Shear Rates at 30° C.

| Concentration (w/v) | $\eta_a$ (poise) Shear Rate (sec$^{-1}$) | | | | |
|---|---|---|---|---|---|
| | 1 | 2 | 4 | 10 | 20 |
| 2% | 16 | 10 | 7.5 | 4.3 | 3.4 |
| 4% | 72 | 57.5 | 46.2 | 29.5 | 26.5 |
| 6% | 400 | 250 | 197.5 | 127.8 | 91 |
| 8% | 640 | 440 | 300 | 180 | 124 |

TABLE 6

$\eta_a$ for Different Mw of 6% Celllulose Solution
at Various Shear Rates at 30° C.

| Mw | $\eta_a$ (poise) Shear Rate (sec$^{-1}$) | | | | |
|---|---|---|---|---|---|
| | 1 | 2 | 4 | 5 | 10 |
| 8.83 × 10⁴ (D.P. 545) | 400 | 250 | 137.5 | 127.8 | 91 |
| 1.01 × 10⁵ (D.P. 625) | 1180 | 870 | 625 | 388.8 | 277 |
| 1.64 × 10⁵ (D.P. 1015) | 2114 | 1350 | 870 | 448 | 271 |

Experiment 2

Dissolving wood pulp sheets, characteristics set forth in Table 7, were used in this experiment. The sheets were shredded in a Wiley mill using No. 20 gauge screen and then dried 24 hours at 60° C. in a vacuum oven.

The ammonia-ammonium thiocyanate solvent solution was prepared as in Example 1.

Wet Spinning of Cellulose/1NH$_3$/NH$_4$SCN Solutions

A 6% w/v solution of sample 5, Table 7 was prepared for wet spinning. The solution had a viscosity of 11,000 poise at 25° C. as measured by a Brookfield Viscometer. A spinnerette was prepared by using a #18 gauge hypodermic needle of 3 mm length. The highly viscous spinning solution was loaded into a syringe body and forced through the spinnerette with 82.7 kilonewtons/m² air pressure into the appropriate coagulation bath. Spinning speeds were generally about 1 m/minute. Attenuation of the extrudate, as is required for physical property optimization, was not possible with the system employed. Upon removal from the bath, the fibers were dried under tension at 100° C. Physical properties were determined at 50% relative humidity and 22° C. on an Instrom TM Tensiometer. The elongational strain rate was 120%/minute.

Formation of Cellulose Fibers From Stirred Solutions

A 1.5% w/v solution of sample 2, Table 1 was prepared and filtered through a course fritted disc funnel under pressure. The solutions were observed microscopically to be free of gels and undissolved fibers. The fiber-forming experiments were carried out by dripping 1 part cellulose solution into 2 parts coagulant stirred with a magnetic bar in a 100 ml boiling flask. The precipitants were dimethyl sulfoxide (DMSO) and pyridine.

Characterization of the Removed Cellulose

The samples of wet spun cellulose fibers were characterized by wide-angle X ray diffraction. A crystallinity index, following the method of Connors et al was obtained using a Perkin-Elmer 281-B Infrared Spectrophotometer.

Fiber Forming Potential of the
Cellulose/1NH$_3$/NH$_4$SCN System

Wet Spinning

Rudimentary fiber extrusion from a modified syringe was readily demonstrated. The coagulation systems used are listed in Table 10. All of the coagulating baths contain proton donating agents. X-ray diffractograms revealed the fibers to have the Cellulose II crystal lattice, and are quite similar to diffractograms of rayon. The dissolving pulp was Cellulose I. Stress-strain data are summarized in Table 11. The infrared crystallinity index of Nelson et al was found to average 0.50 for cellulose coagulated from water compared to 0.32 for the original dissolving pulp.

Cellulose Fibers From Stirred Solutions

In an attempt to determine the feasibility of forming cellulose fibers from stirred solutions for the 1NH$_3$/NH$_4$SCN system, the procedure of Kalb and Manley was followed with slight alterations. The fibers had a uniform diameter and are formed within a gel which shows no birefringence. Similar results are observed using DMSO as the coagulate.

To further characterize these materials, some gel containing the fibers, from the pyridine bath, was carefully vacuum dried at 40° C. and observed via scaning electron microscopy. The fiber has a flat ribbon like appearance.

TABLE 7

Wood Pulp Data

| ITT Rayonier Grade name | Pulp Process | Wood Furnish | Degree of Polymerization[1] (D.P.$_w$) | MW$_w$ |
|---|---|---|---|---|
| 1 Cellunier F | sulfite | South Pine | 625 | 1.01 × 10⁵ |
| 2 Cellunier Q | sulfite | Hemlock | 725 | 1.24 × 10⁵ |
| 3 Excel Q | sulfite | Hemlock | 1015 | 1.64 × 10⁵ |

[1]Calculated from the sedimentation coefficient of a nitrated smaple of the pulp, bu ITT Rayonier Inc.

TABLE 8

Gel Melting Points for Cellulose/1NH$_3$/NH$_4$SCN

| Cellulose Sample | Concentration (g/l at 25° C.) | Gelling Time at −12° C. (hr) | Melting Point (°C.) | |
|---|---|---|---|---|
| | | | 0.5 mm capillary | 1.0 mm capillary |
| 1a | 9.99 | 24 | 23.23 | 22.63 |
| 1b | 7.43 | 24 | 22.76 | 22.57 |
| 1c | 5.39 | 24 | 22.48 | 22.41 |
| 2a | 10.63 | 24 | 24.76 | 24.23 |
| 2b | 7.85 | 24 | 23.84 | 23.84 |
| 2c | 5.12 | 24 | 23.33 | 23.32 |
| 3a | 10.15 | 24 | 25.10 | 24.61 |
| 3b | 6.25 | 24 | 24.12 | 23.96 |
| 3c | 3.18 | 24 | 23.60 | 23.60 |
| 3d | 8.20 | 24 | 24.74 | 24.11 |
| 3e | 8.20 | 67 | 26.03 | 24.30 |
| 3f | 4.84 | .17 | 23.77 | 23.47 |

TABLE 9

Junction Formation Energies $\Delta H_m$ and $\Delta H_c$ for the Cellulose/1NH$_3$/NH$_4$SCN System

$\Delta H_c$

| Sample | Capillary Size | $-\Delta H_c$ (kcal/mole) |
|---|---|---|
| 1 | .5 | 135 |
|   | 1.0 | 613 |
| 2 | .5 | 87.6 |
|   | 1.0 | 145 |
| 3 | .5 | 129 |
|   | 1.0 | 186 avg. 216 |

$\Delta H_m$

|  | | $-\Delta H_m$ (kcal/mole) |
|---|---|---|
| c = 3 g/l | .5 | 346 |
|  | 1.0 | 532 |
| c = 6 g/l | .5 | 329 |
|  | 1.0 | 389 |
| c = 9 g/l | .5 | 303 |
|  | 1.0 | 313 avg. 369 |

TABLE 10

Coagulation Systems Evaluated for Wet Spinning Cellulose/1NH$_3$/NH$_4$SCN Solutions

| Bath # | Suitable Baths (20° C.) |
|---|---|
| 1 | H$_2$O (50° C.) |
| 2 | 2.5% aq H$_2$SO$_4$ |
| 3 | 5.0% aq H$_2$SO$_4$ |
| 4 | 7.5% aq H$_2$SO$_4$ |
| 5 | 10% aq H$_2$SO$_4$ |
| 6 | 20% aq acetic acid |
| 7 | 30% aq acetic acid |
| 8 | 66% aq acetic acid |
| 9 | Glacial acetic acid |
| 10 | 30% aq acetic acid/12% w/v NaCl |
| 11 | 10% aq H$_2$SO$_4$/15% w/v ZnSo$_4$ |
| 12 | Methanol |
|  | Baths Found to be Not Suitable (20° C.) |
| 13 | H$_2$O |
| 14 | 15% w/v aq ZnSO$_4$ |
| 15 | 15% w/v aq Na$_2$SO$_4$ |
| 16 | 7.5% aq H$_2$SO$_4$/15% w/v Na$_2$SO$_4$ |
| 17 | 50% v/v Methanol/50% v/v acetic acid |

TABLE 11

Fiber Properties of the Wet Spun Samples

| Bath # | Denier | Tenacity (g/den) | Elongation at break (%) | Modulus[1] (g/den) |
|---|---|---|---|---|
| 1 | 345 | .324 | 4.81 | 8.87 |
| 2 | 413 | .363 | 5.68 | 7.85 |
| 3 | 273 | .354 | 3.31 | 11.2 |
| 4 | 190 | .532 | 3.34 | 17.7 |
| 5 | 173 | .212 | 1.49 | 15.4 |
| 6 | 222 | .782 | 8.07 | 14.0 |
| 7 | 259 | .490 | 7.12 | 11.6 |
| 8 | 535 | .227 | 7.58 | 4.55 |
| 9 | 268 | .289 | 2.20 | 11.2 |
| 10 | 560 | .060 | 12.4 | .576 |
| 11 | 454 | .283 | 5.66 | 6.74 |
| 12 | 463 | .401 | 6.36 | 7.62 |

[1] Initial modulus = tenacity at 100% elongation.

Experiment 3

Wet spinning of cellulose/liquid ammonia/ammonium thiocyanate solution. A 6% weight/volume solution of Cellunier P [DP=715] was prepared for wet spinning. The solution had a viscosity of 5200 poise at 30° C. as measured by a Brookfield viscometer. The wet spinning apparatus consisted of (1) a solution delivery system, (2) a 10-hole 0.009 inch platinum gold spinnerette; (3) a coagulation bath at 25° C. and (4) a take-up device. The spinning solution was forced through the spinnerette with 11½ psi air pressure into the methanol coagulation bath. The spinning speed was 1.35 meters per minute. After removal from the take-up device, the filament was washed by distilled water for 10 minutes then dried at room temperature. A fiber filaments of about 5 denier were obtained.

What is claimed as new and intended to be covered by Letters Patent is:

1. A method of forming a cellulose fiber which comprises dissolving cellulose in a solvent comprising ammonia and a salt selected from the group consisting of ammonium iodide, ammonium nitrate, ammonium perchlorate, ammonium thiocyanate, sodium iodide, sodium nitrate, sodium perchlorate, and sodium thiocyanate and subsequently forming a fiber by wet spinning said cellulose and coagulating the cellulose.

2. The method of claim 1, wherein said solvent contains about 20-50 wt. % ammonia.

3. The method of claim 2, wherein said solvent contains about 50-80 wt. % of said salt.

4. The method of claim 1, wherein up to 20 w/v % of cellulose is dissolved in said solvent.

5. The method of claim 4, wherein from 2-14 w/v % of cellulose is dissolved in said solvent.

6. The method of claim 1, wherein said coagulation is accomplished in a bath comprising water, acetic acid, sulfuric acid, or methanol.

7. The method of claim 1, wherein said solvent contains up to 8 wt. % water.

8. A method of forming cellulose films which comprises dissolving cellulose in a solvent comprising ammonia and a salt selected from the group consisting of ammonium iodide, ammonium nitrate, ammonium perchlorate, ammonium thiocyanate, sodium iodide, sodium nitrate, sodium perchlorate, and sodium thiocyanate and subsequently casting a film on a coagulation bath.

9. The method of claim 8, wherein said solvent comprises about 20-50 wt. % ammonia.

10. The method of claim 9, wherein said solvent comprises about 50-80 wt. % of said salt.

11. The method of claim 8, wherein up to 20 w/v % of said cellulose is dissolved in said solvent.

12. The method of claim 8, wherein said coagulation bath comprises water, acetic acid, sulfuric acid or methanol.

13. A method of forming cellulose fibers or films which comprises:
(a) dissolving cellulose in an ammonia-solvent comprising ammonia and a salt selected from the group consisting of ammonium iodide, ammonium nitrate, ammonium perchlorate, ammonium thiocyanate, sodium iodide, sodium nitrate, sodium perchlorate, and sodium thiocyanate;
(b) admixing with the resulting ammonia-solvent cellulose solution a solvent which is capable of maintaining cellulose in a dissolved state;
(c) removing from the resulting admixture the ammonia and salt; and
(d) forming a cellulose fiber or film from the resulting cellulose solution.

14. The method of claim 13, wherein said ammonia-solvent comprises about 20-50 wt. % ammonia.

15. The method of claim 13 or 14, wherein said ammonia-solvent comprises about 50-80 wt. % of said salt.

16. The method of claim 13, wherein said solvent is glycerol, dimethyl formamide, 2-pyrolidone, ethylene diamine, morpholine or pyridine.

17. The method of claim 13, wherein from 50 v/v % to 300 v/v % of solvent are admixed with said ammonia-solvent cellulose solution.

18. The method of claim 13, wherein cellulose fibers are prepared by dry-spinning.

19. The method of claim 13, wherein cellulose films are prepared by casting a film of the cellulose and evaporating said solvent.

20. The method of claim 13, wherein said solvent comprises up to 8 wt. % water.

21. The method of claim 13, wherein cellulose fibers are prepared by wet-spinning.

22. The method of claim 13, wherein cellulose films are prepared by casting a film of the cellulose onto a coagulation bath.

* * * * *